(12) United States Patent
Servet

(10) Patent No.: US 8,177,249 B2
(45) Date of Patent: May 15, 2012

(54) ADJUSTABLE-LENGTH BICYCLE STEM

(75) Inventor: Sébastien Servet, Nevers (FR)

(73) Assignee: Look Cycle International, Nevers (FR)

( * ) Notice: Subject to any disclaimer, the term of this patent is extended or adjusted under 35 U.S.C. 154(b) by 89 days.

(21) Appl. No.: 12/769,864

(22) Filed: Apr. 29, 2010

(65) Prior Publication Data

US 2010/0275723 A1 Nov. 4, 2010

(30) Foreign Application Priority Data

Apr. 30, 2009 (FR) ..................................... 09 52877
Oct. 23, 2009 (FR) ..................................... 09 57456

(51) Int. Cl.
*B62K 21/16* (2006.01)
*B62K 21/22* (2006.01)

(52) U.S. Cl. ...................... 280/279; 280/281.1; 74/551.3

(58) Field of Classification Search ............... 280/288.4, 280/279, 281.1; 74/551.3; 403/322.4
See application file for complete search history.

(56) References Cited

U.S. PATENT DOCUMENTS

| | | | | |
|---|---|---|---|---|
| 5,273,302 A * | 12/1993 | Ureel | ............................. | 280/279 |
| 5,327,798 A | 7/1994 | Lerch, Jr. | | |
| 5,404,769 A | 4/1995 | Kao | | |
| 5,562,013 A * | 10/1996 | Kao | ............................. | 74/551.3 |
| 5,842,385 A | 12/1998 | Su | | |
| 6,192,773 B1 * | 2/2001 | Liao | ............................. | 74/551.3 |
| 7,699,332 B2 * | 4/2010 | Lai | ................................. | 280/279 |
| 2006/0099027 A1 * | 5/2006 | Liao | ........................... | 403/322.4 |
| 2006/0162482 A1 * | 7/2006 | Okajima et al. | .............. | 74/551.1 |
| 2009/0079160 A1 | 3/2009 | Lai | | |
| 2011/0107872 A1 * | 5/2011 | Servet | .......................... | 74/551.3 |

FOREIGN PATENT DOCUMENTS

| | | |
|---|---|---|
| CN | 200992282 | 12/2007 |
| EP | 1 695 900 | 8/2006 |
| EP | 1 759 976 | 3/2007 |
| FR | 2 436 065 | 4/1980 |

OTHER PUBLICATIONS

French Search Report dated Jan. 20, 2010, from corresponding French application.

* cited by examiner

*Primary Examiner* — Tony Winner
(74) *Attorney, Agent, or Firm* — Young & Thompson

(57) ABSTRACT

A bicycle stem includes a stem body (2) that is provided with first elements (3) adapted to attach the bicycle stem to a pivoting tube and second elements (25) adapted to attach a handlebar to the stem. The handlebar include a U-shaped cap (27) that has first connecting elements (32) that connect to second connecting elements (33) that are provided at the front end of the stem body (2) to attach the U-shaped cap (27) opposite a recess (30) provided on the front end of the stem body to receive the handlebar. The length of the stem can be modified using a crescent-shaped spacer (35) that is placed in a U shape for obtaining a reduced length of the stem or in the recess (30) to obtain a more significant length.

20 Claims, 4 Drawing Sheets

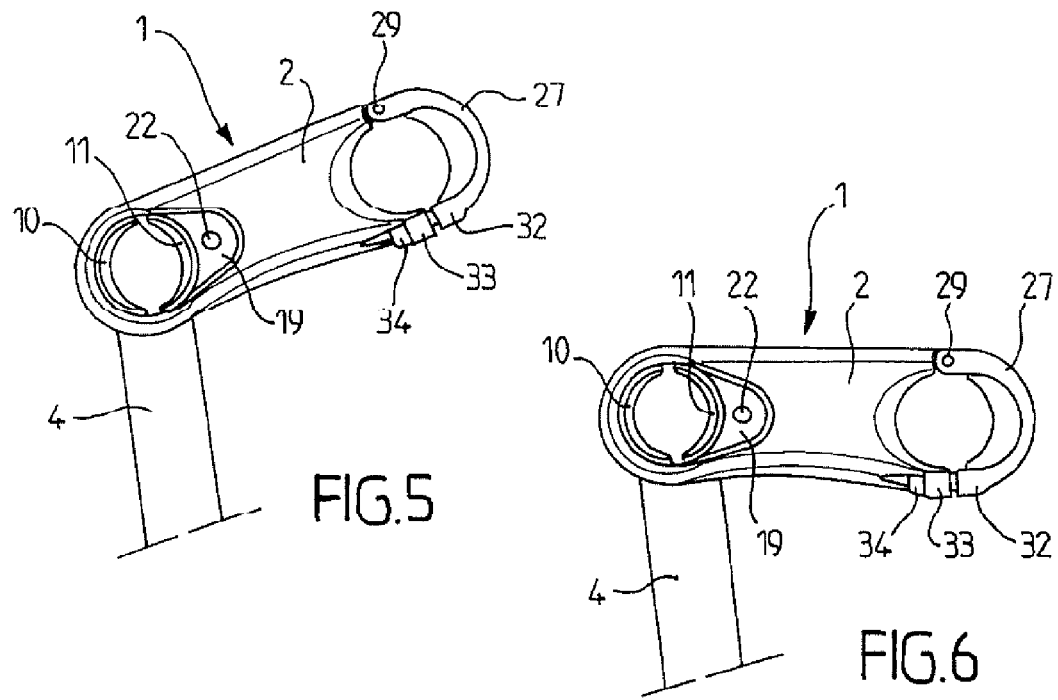
FIG.5
FIG.6
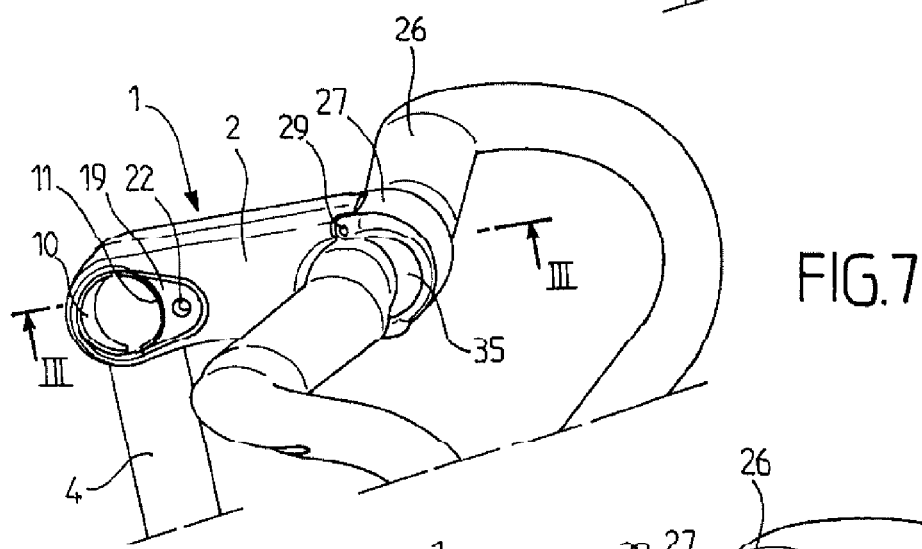
FIG.7
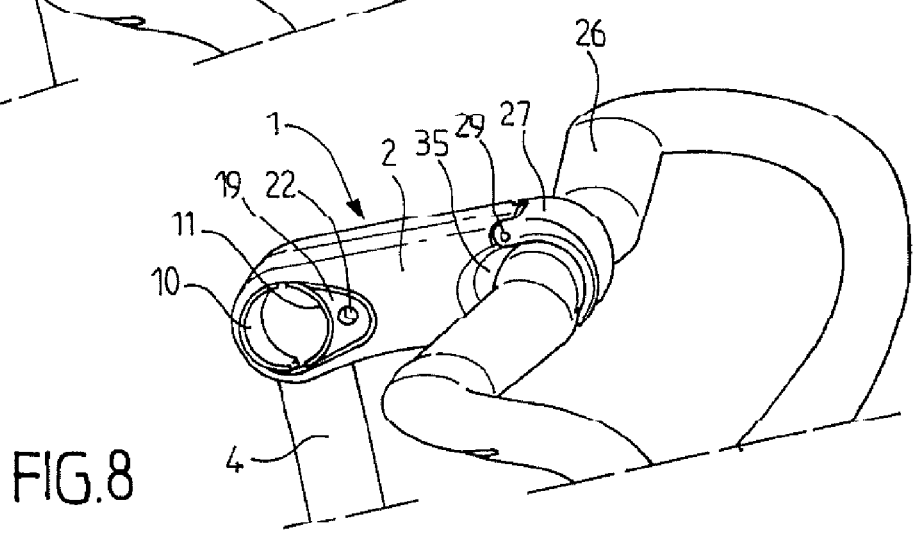
FIG.8

ADJUSTABLE-LENGTH BICYCLE STEM

BACKGROUND OF THE INVENTION

1. Field of the Invention

This invention relates to an adjustable-length bicycle stem. At one of its ends, the stem carries the handlebar of the bicycle, and at its opposite end, it is attached to the upper portion of the pivoting tube that is mounted to rotate in the steering socket of the bicycle frame.

2. Description of the Related Art

The advantage of the adjustable length of the stem resides in the fact that it can be adapted to be convenient to individuals assuming a different position on the bicycle.

So as to implement an adjustment of the length of the stem to prevent, to a certain extent, producing a range of stems of different lengths, U.S. Pat. No. 5,842,385 also proposes housing the handlebar in an insert with an eccentric hole. However, the adjustment is relatively complicated to carry out since by rotating the insert, the angle of inclination of the stem is also modified.

This also applies to the adjustable-length stem that is described in the publication EP1759976 that uses an insert that consists of a cylindrical body in which an eccentric through hole is provided to accommodate the handlebar of the bicycle. The cylindrical body is in two parts that are connected to one another by rib and groove means to clamp the handlebar. This insert is placed in a cylindrical through hole of the stem that is closed toward the front by a U-shaped cap. The drawback of this implementation is that the height of the stem at this location is necessarily relatively significant to allow a meaningful movement of the stem in the horizontal and vertical directions, which corresponds to twice the eccentricity of the receiving hole of the handlebar. The stem that is obtained is consequently relatively bulky in its front part.

The document U.S. Pat. No. 5,404,769 describes an adjustable-length stem that operates according to the same principle as that of EP1759976, and the space requirement of the device emerges still more clearly from this document.

One of the purposes of this invention is thus to propose an adjustable-length stem that at its front end has the same height as for the remainder of the stem, which improves the appearance of the stem and makes it possible to reduce its weight.

So as to be able to adjust the tilt of the stem, the means for attaching the stem to the pivoting tube comprise articulation means as is known from, for example, the publications CN200992282, U.S. Pat. Nos. 5,327,798 or 5,842,385.

Furthermore, the selection of the height of the conventional stems is made by cutting the pivoting tube to the desired length, and annular inserts are then placed between the stem and the steering tube. This height is thus adjustable by varying the number of inserts.

In short, all of the known stems of this type are relatively complicated by their design and comprise a large number of parts to be assembled, which brings about heavy weight and high cost and often also a loss of rigidity of the unit.

SUMMARY OF THE INVENTION

The purpose of the invention is to propose a bicycle stem that comprises simple means for adjusting the length of the stem.

Another object of the invention is to propose a bicycle stem with simplified adjustment of the tilt of the stem, which comprises very few parts and which provides an improved rigidity to the unit.

The object of the invention is an adjustable-length bicycle stem, comprising a stem body of which one of the ends is provided with first means for attaching the stem to the upper end of a pivoting tube and of which the opposite end is provided with second means for attaching a handlebar to the stem, whereby said second attachment means comprise at least one U-shaped cap that has a shape that is adapted to the shape of the handlebar and that carries first connecting means that can be connected to second connecting means that are provided at the front end of the stem body so as to attach said U-shaped cap opposite a recess that is provided at the front end of the stem body and that has a shape that is adapted to the shape of the handlebar for receiving the latter so as to clamp it using said U-shaped cap, characterized by the fact that the length of the stem can be modified using at least one spacer that has, seen from the side, a crescent shape that has opposite support surfaces that substantially reproduce the shape of the handlebar to as to allow said spacer to be placed either in the shape of a U of the cap to obtain a reduced length of the stem or in said receiving recess at the front end of the stem body for obtaining a more significant length.

According to other characteristics of the invention:
Said crescent-shaped spacer is a single part and extends over the entire width of the stem body;
A so-called crescent-shaped spacer is placed on each lateral side of the stem body and the two spacers are connected to one another by male and female connecting elements that extend crosswise to be locked in one another;
Said male and female elements are held in one another by ratcheting;
Said first connecting means are placed at the two ends of said U-shaped cap to work with second connecting means that are placed at the upper and lower parts of the stem body on both sides of said recess for receiving the handlebar;
Said U-shaped cap is articulated to the stem body at one of its ends to be tilted over said recess for receiving the handlebar;
Said first attachment means comprise articulation means that make it possible to adjust the tilt of the stem, and tightening means that make it possible to lock the stem in a desired angular position, whereby said tightening means comprise first and second tightening elements of an overall semi-cylindrical shape extending crosswise in a housing that has an opening that is directed downward so as to allow the insertion there of the pivoting tube, whereby said first and second tightening elements are provided at their respective upper and lower ends with a receiving recess that is adapted to the periphery of the pivoting tube, whereby said housing has an at least partially cylindrical wall cooperating with said first tightening element so as to define together said articulation means;
Said second tightening element is drawn toward said first tightening element by an element that forms a wedge that can move crosswise in said housing;
Said element that forms a wedge has a cylindrical support surface that assumes the outside shape of said second tightening element;
An element that forms a wedge is placed on two sides of the stem body and the two elements that form a wedge are connected to one another by a tightening screw;
Said housing is open laterally from the two sides of the stem body;
Said recesses for receiving said first and second tightening elements are extended upward or downward by a respective projecting flange that defines an enlarged support surface for the pivoting tube; and Said flanges project into a groove of the housing in said at least one cylindrical portion of the latter so as to constitute crosswise locking means of said first and second tightening elements when the pivoting tube is inserted into the housing and tightened between said tightening elements.

BRIEF DESCRIPTION OF THE DRAWING FIGURES

Other characteristics and advantages of the invention will emerge from the following description of a nonlimiting embodiment of the invention with reference to the accompanying figures in which:

FIGS. 5 and 6 are diagrammatic side views that show the stem according to the invention in two end positions on the pivoting tube;

FIG. 7 is a perspective view that illustrates the stem with a reduced length;

FIG. 8 is a perspective view that illustrates the stem with an increased length.

DETAILED DESCRIPTION OF THE INVENTION

In the figures, the identical or equivalent elements will have the same references.

Figure 2:
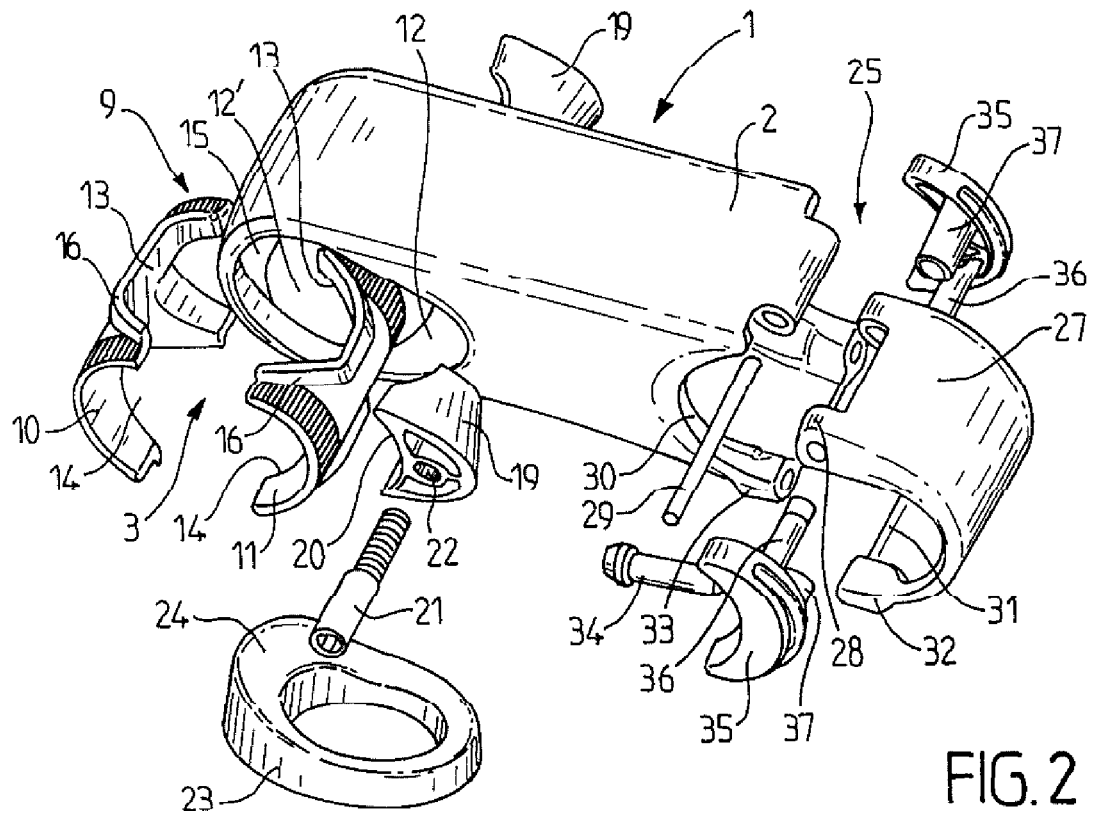
FIG. 2 is an exploded perspective view of the stem according to the invention.

The constituent elements of the stem 1 according to the invention are shown in FIG. 2.

Figure 1:
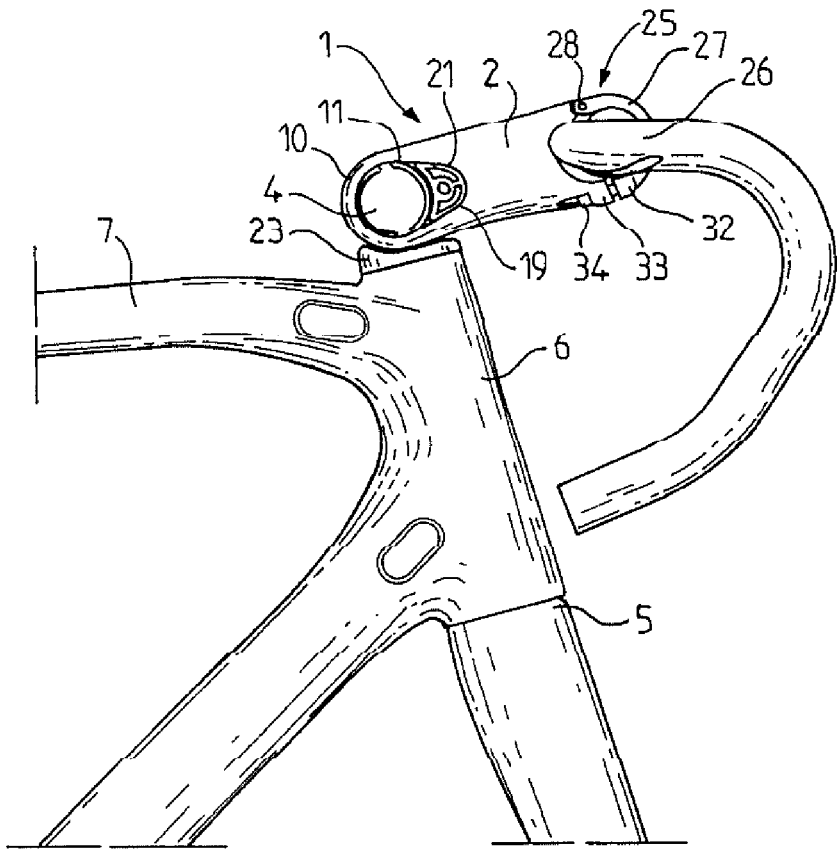
FIG. 1 is a partial side view of a bicycle that is equipped with a stem according to the invention.
Figure 3:
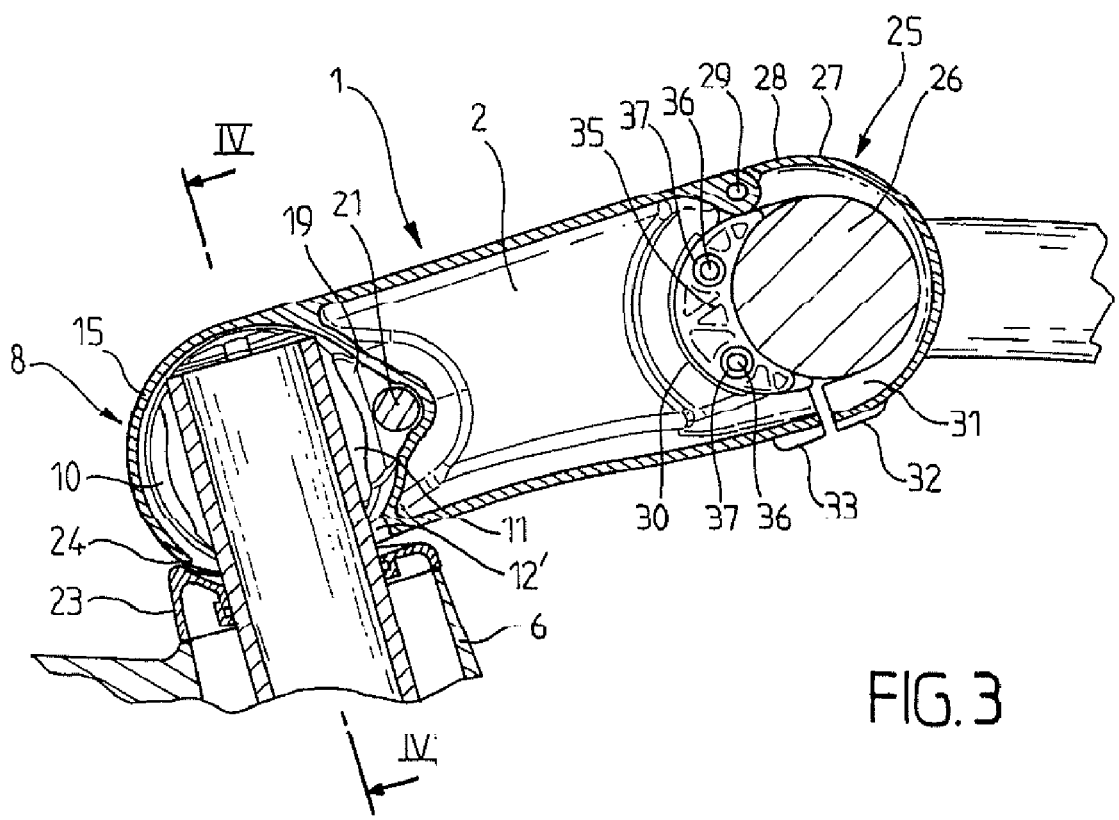
FIG. 3 is a longitudinal section of the stem along line III-III of FIG. 7, assembled and attached to a pivoting tube and carrying a handlebar.

The stem body 2, which is a hollow body that is preferably made of compressed carbon and that has the shape of a box with rounded ends, is visible there (see FIGS. 1 and 3).

The rear end of the stem body 2 is provided with first means 3 for attaching the stem 1 at the upper end of a fork pivoting tube 4 that in turn is attached to the fork head 5 and is mounted to pivot in the steering tube 6 that is part of the frame 7 of the bicycle.

The attachment means 3 also comprise articulation means 8 that make it possible to adjust the tilt of the stem 1 as well as tightening means 9 that make it possible to lock the stem 1 in a desired position.

According to an important characteristic of the invention, the tightening means 9 comprise a first tightening element (10) and a second tightening element (11) of an overall semi-cylindrical shape that extends crosswise into a housing 12 that is provided at the rear end of the stem 1.

The housing 12 has an opening 12' that is directed downward so as to make it possible to insert the pivoting tube 4. The first and second tightening elements 10, 11 are provided at their respective upper and lower ends with a receiving recess 13 or 14 that is adapted to the periphery of the pivoting tube 4. The housing 12 has an at least partially cylindrical wall 15 that is able to work with the first tightening element 10 so as to define together the articulation means 8.

Figure 4:
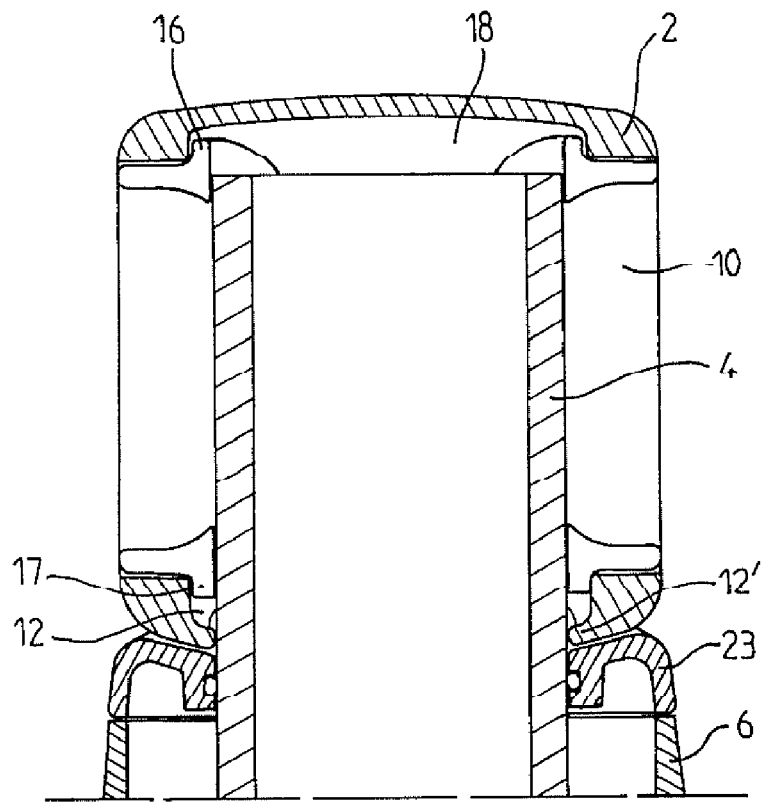
FIG. 4 is a crosswise section of the stem along line IV-IV of FIG. 3.

Furthermore, the receiving recesses 13, 14 that are provided in the first and second tightening elements 10, 11 are advantageously extended upward or downward by a respective projecting flange 16, 17 (see FIG. 4) for defining an enlarged support surface for the pivoting tube 4.

Advantageously, these projecting flanges 16, 17 project into a groove 18 of the housing 12 (see FIG. 4) so as to constitute crosswise locking means of the first and second tightening elements 10, 11 when the pivoting tube 4 is inserted into the housing 12 so as to rest against the wall of the upper and lower recesses 13, 14 of the first and second tightening elements 10, 11.

For the tightening of the pivoting tube 4 by the first and second tightening elements 10, 11, the second tightening element 11 is drawn toward the first tightening element by an element that forms a wedge 19 that can move crosswise in the housing 12.

This element that forms a wedge 19 has a cylindrical surface 20 that assumes the outside shape of the second tightening element 11. Preferably, and for a better balance, such an element that forms a wedge 19 is placed on two sides of the stem body 2, whereby these two elements that form a wedge are connected to one another by a tightening screw 21 that is inserted into a smooth through hole 22 for working with a tapping that is provided in the other element that forms a wedge, whereby this tapping is, for example, in the form of a screw (not shown) buried in the body of the latter.

For the assembly of the first and second tightening elements 10, 11 as well as two elements that form a wedge 19 inside the housing 12, the latter is open crosswise from the two sides of the stem body 2.

To attach the pivoting tube 4 to the stem 1, first the tightening screw 21 is loosened to move the elements that form a wedge 19 toward the outside by separating them from one another so as to create a certain play between the first and second tightening elements 10, 11 so as to facilitate the insertion of the pivoting tube 4 into the housing 12.

Then, it is only necessary to insert the pivoting tube 4 into the housing 12 until it just abuts against the wall of the housing to adjust the tilt of the stem 1 using articulation means 8 and to tighten the first and second tightening elements 10, 11 around the pivoting tube 4 by manipulating the tightening screw 21 that moves the elements that form a wedge 19 crosswise to the inside so as to draw the second tightening element 11 in the direction of the first tightening element 10.

Of course, the opening 12' of the housing 12 has an elongated shape in the axial direction of the stem 2 so as to make possible a certain angular travel of the stem 1 as is illustrated in FIGS. 5 and 6, whereby FIG. 5 shows the upper end position, and FIG. 6 shows the lower end position of the stem, with a continuous adjustment between these two positions.

The length of the pivoting tube 4 is determined during the manufacturing, but the height of the stem 1 above the steering tube 6 can be adjusted using an annular insert 23 that is placed between these two elements. The frame can advantageously be provided with a set of inserts with different thicknesses that on one portion of their surface that is rotated upward have a curved shape that is adapted to the outside shape of the portion of the stem body 2 that defines the articulation. In this way, the support surface of the stem 1 on the insert 23 becomes more significant, which contributes to the stability of the unit.

The front end of the stem body 2 is provided with second means 25 for attaching a handlebar 26 to the stem 1. These second attachment means 25 comprise a U-shaped cap 27 that at one of its ends 28 is articulated to the stem body 2 around an axis 29 to be retracted so as to be placed opposite a recess 30 that has a shape that is adapted to the shape of the handlebar 26 for receiving the latter, whereby this recess is provided at the front end of the stem body 2. The U-shaped cap also has a shape that is adapted to the shape of the handlebar and at its opposite end 31 has first connecting means 32 that can be connected to second connecting means 33 that are provided on the stem body. The first and second connecting means 32, 33 are connected to one another by a pair of attachment screws 34, one screw on each side, so as to loosen the handlebar 26.

According to a variant, not shown, the cap 26 is in two parts and defines virtually two tightening rings with two recesses to the front of the stem.

According to the invention, the length of the stem can be modified using a spacer that, seen from the side, has a crescent shape 35 that is adapted to be placed in the shape of a U of the cap 27 for obtaining a reduced length of the stem 1 or in the receiving recess 30 at the end of the stem body 2 for obtaining a more significant length. The crescent-shaped spacer 35 consequently has opposite support surfaces that essentially reproduce the shape of the handlebar 26.

The receiving hole of the handlebar is thus an elongated hole that is defined by the recess 30 and by the U-shaped cap 27. The cylindrical sector end surfaces of this receiving hole are connected to one another by two plane and parallel surfaces, which makes it possible to reduce the height of the entire front portion of the stem.

Using this device, it is thus possible to move the handlebar 26 toward or away from the bicyclist.

Preferably, a spacer 35 of this type is placed on each lateral side of the stem body 2. The two spacers are connected to one another by male connecting elements 36 and female connecting elements 37 that extend crosswise toward the inside to work with one another by being fitted into one another. These spacers 35 are advantageously kept together by ratcheting male and female elements 36, 37.

Because the stem body 2 is housed in the receiving recess 30, with or without a spacer 35, after its assembly on the pivoting tube 4 and after having received the handlebar 26 that is closed on two sides, i.e., on one side by the second tightening element 11 and on the other side by the handlebar 26, an airtight housing is formed that is found virtually integrated in the frame 7, which makes possible a gain in rigidity but also a better appearance and a continuity of shapes.

Figure 9:
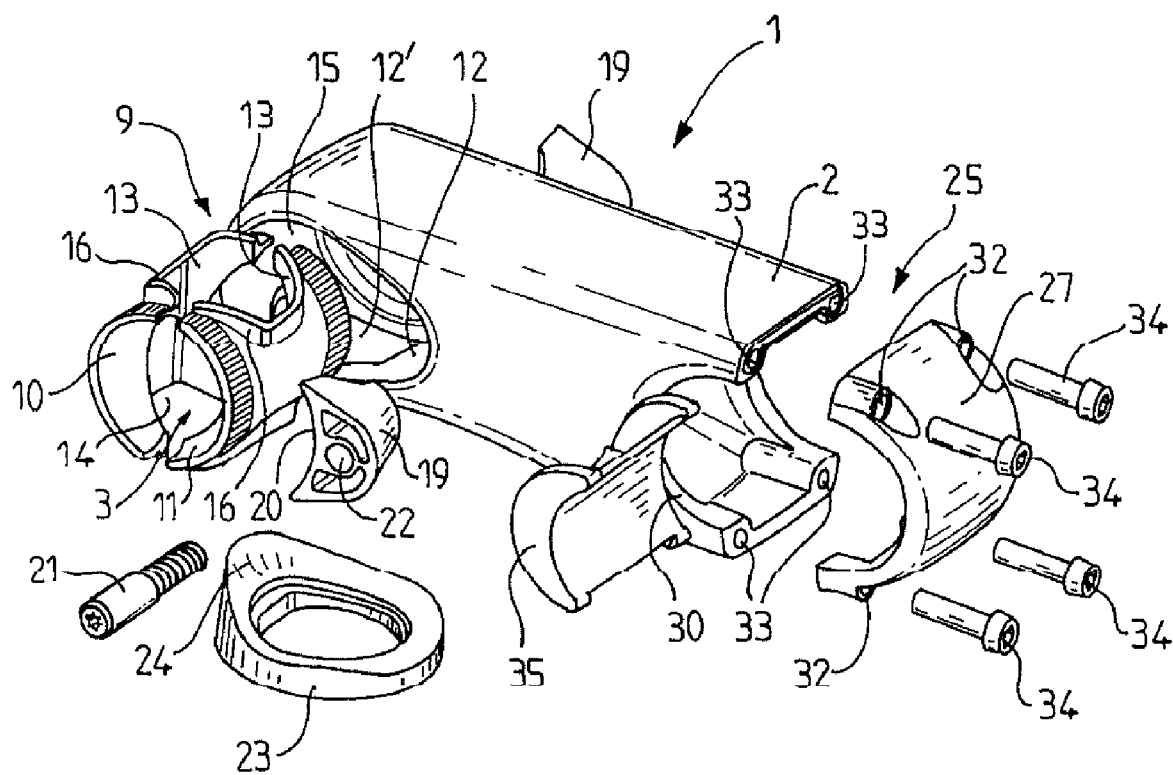
FIG. 9 is an exploded perspective view of the stem according to the invention that is similar to FIG. 2 and that shows a variant of the spacer that makes it possible to adjust the length of the stem.

One variant of the stem according to the invention is illustrated in FIG. 9. It differs from the stem that is described with reference to FIG. 2 by two aspects.

First of all, the spacer 35 is made of a single part and extends over the entire width of the stem body 2. This constitutes a simplification relative to the use of two spacers that are connected to one another as has just been described.

Secondly, instead of using an articulation to connect the U-shaped cap 27 to the upper portion of the front end of the stem 2, first connecting means 32 are placed at the two ends of the U-shaped cap to work with second connecting means 33 that are placed on the upper and lower portions of the stem element 2, on both sides of the recess 30 for receiving the handlebar 26 for placing the U-shaped cap 27 opposite this receiving recess. Just as in the variant that is described with reference to FIG. 2, the first and second connecting means 32, 33 are connected to one another by a pair of attachment screws 34, one screw on each side.

Thanks to the invention, a bicycle stem is thus obtained that allows the adjustment of its height, its length and its tilt by extremely simple and reliable means.

Of course, the invention is not limited to the illustrated and described examples, and one skilled in the art will be able to provide combinations of these different embodiments as well as other variants without thereby leaving the scope of the invention.

The invention claimed is:

1. An adjustable-length bicycle stem, comprising:
a stem body (2);
a first means (3) for attaching the stem (1) at an upper end of a pivoting tube (4), the first means (3) for attaching being provided at one end of the stem body (2);
a second means (25) for attaching a handlebar (26) to the stem (1), said second means (25) for attaching being provided at an opposite end of the stem; and
at least one crescent-shaped spacer for adjusting a length of the stem body, said spacer is detachably attached to the second means.

2. The bicycle stem according to claim 1, wherein said at least one crescent-shaped spacer (35) is a single part and extends over an entire width of the stem body (2).

3. The bicycle stem according to claim 1, wherein said at least one crescent-shaped spacer comprises left and right portions; said left and right portions are placed on each lateral side of the stem body and are connected to one another by male and female connecting elements (36, 37).

4. The bicycle stem according to claim 3, wherein said male and female elements (36, 37) are held in one another by ratcheting.

5. An adjustable-length bicycle stem, comprising:
a stem body (2) including first and second ends wherein said first end comprises a housing with first and second opening, said second opening is perpendicular to said first opening;
an attachment element (3) configured for attaching the stem (1) at an upper end of a pivoting tube (4), the attachment element (3) for attaching being provided at one end of the stem body (2);
at least one U-shaped cap (27) configured for attaching a handlebar (26) to the stem (1), the at least one U-shaped cap (27) being provided at the second end of the stem body, the U-shaped cap having shape that is adapted to a shape of the handlebar (26) and that carries a first connector (32) that can be connected to a second connector (33) that is provided at the second end of the stem body (2) so as to attach said U-shaped cap (27) opposite a recess (30) that is provided at the second end of the stem body and that has a shape adapted to the shape of the handlebar (26) so as to clamp the handlebar (26) using said U-shaped cap (27),
wherein a length of the stem (1) can be modified using at least one spacer (35) that has, seen from the side, a crescent shape with opposite support surfaces that substantially matching the shape of the handlebar (26) so as to allow said spacer (35) to be placed either in the U-shaped cap (27) to reduce an overall length of the stem (1) or in said receiving recess (30) at the opposite end of the stem body (2) for increasing length.

6. The bicycle stem according to claim 5, wherein said crescent-shaped spacer (35) is a single part and extends over an entire width of the stem body (2).

7. The bicycle stem according to claim 5, wherein said at least one crescent-shaped spacer comprises left and right portions; said left and right portions are placed on both lateral side of the stem body and are connected to one another by male and female connecting elements (36, 37).

8. The bicycle stem according to claim 5, wherein a crescent-shaped spacer (35) is extended over an entire width of the stem body (2).

9. The bicycle stem according to claim 8, wherein said first connector (32) is placed on the two ends of said U-shaped cap (27) for cooperating with said second connector which is located on both sides of said recess and on the upper and lower portions of the stem body (2).

10. The bicycle stem according to claim 8, wherein said U-shaped cap (27) is connected to the stem body (2) at one of its ends (28, 31) for articulately receiving the handlebar (26).

11. The bicycle stem according to claim 8, wherein said first attachment element (3) comprises means for articulation of the stem (1),
 semi-cylindrical shape first and second tightening elements (10, 11) extending across a width of said first opening of said housing and said pivoting tube is detachably attached to said second opening of said housing;
 said first and second tightening elements (10, 11) further includes a receiving recess (13, 14) that adapted to connect with a periphery of the pivoting tube.

12. The bicycle stem according to claim 5, wherein said first connector (32) is placed on the two ends of said U-shaped cap (27) for cooperating with said second connector which is located on both sides of said recess and on the upper and lower portions of the stem body (2).

13. The bicycle stem according to claim 5, wherein said U-shaped cap (27) is connected to the stem body (2) at one of its ends (28, 31) for articulately receiving the handlebar (26).

14. The bicycle stem according to claim 5, wherein first and second tightening elements (10, 11) each includes a semi-cylindrical shape extending across a width of said first opening of said housing;
 said tightening elements include an opening at its bottom side for accommodating the pivoting tube (4);
 wherein said housing (12) has at least one cylindrical wall (15) for cooperating with said first tightening element (10) so as to allow for articulation of the stem.

15. The bicycle stem according to claim 14, wherein said housing (12) is open laterally from the two sides of the stem body (2).

16. The bicycle stem according to claim 14, wherein said receiving recesses (13, 14) of said first and second tightening elements (10, 11) are extended upward or downward by a respective projecting flange (16, 17) that defines an enlarged support surface for the pivoting tube (4).

17. The bicycle stem according to claim 14, wherein said second tightening element (11) is drawn toward said first tightening element (10) by at least one wedge (19) that can move across a width of said first opening of said housing.

18. The bicycle stem according to claim 17, wherein said at least one wedge includes a left and a right portion, said portions are placed on both sides of the stem body and connected to one another by a tightening screw (21).

19. The bicycle stem according to claim 17, wherein said wedge (19) has a cylindrical support surface (20) that matches an outside shape of said second tightening element (11).

20. The bicycle stem according to claim 19, wherein said at least one wedge includes a left and a right portion, said portions are placed on both sides of the stem body and connected to one another by a tightening screw (21).

* * * * *